United States Patent [19]
Bott

[11] 3,776,511
[45] Dec. 4, 1973

[54] SPARE TIRE HOIST

[76] Inventor: John A. Bott, 931 Lake Shore Dr., Grosse Pointe Shores, Mich. 48236

[22] Filed: June 26, 1972

[21] Appl. No.: 266,061

[52] U.S. Cl. ................................. 254/1, 224/42.21
[51] Int. Cl. ............................ B66f 1/00, B66d 1/00
[58] Field of Search ..................... 254/1; 224/42.21, 224/42.12; 294/74

[56] References Cited
UNITED STATES PATENTS
3,712,586   1/1973   Nicholson .............................. 254/1

FOREIGN PATENTS OR APPLICATIONS
769,945   6/1934   France ............................. 224/42.21

Primary Examiner—Othell M. Simpson
Assistant Examiner—Robert C. Watson
Attorney—J. King Harness et al.

[57] ABSTRACT

A self-supporting sling-type spare tire hoist for removing a spare tire from a vehicle stowage well. The spare tire is stowed in a generally upright position in the well with the hoist underlying the tire. One end of the hoist is connected to the vehicle while the other end has a handle which by virtue of the self-supporting structure of the hoist, is disposed in a position where it may be readily grasped by the hoist operator. When the user pulls the handle outwardly of the stowage well, the hoist cradles the tire, slinging it out of the well.

8 Claims, 8 Drawing Figures

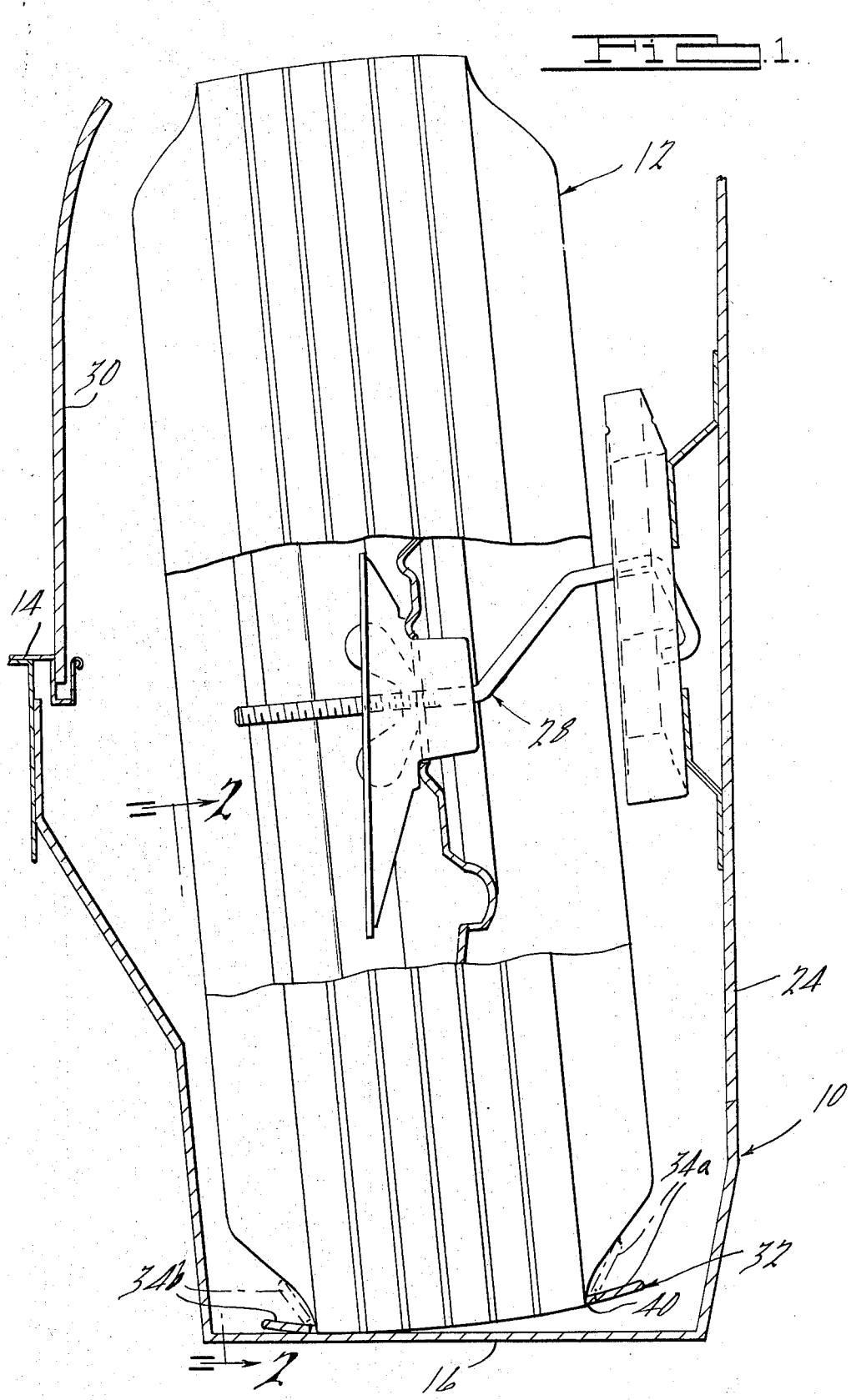

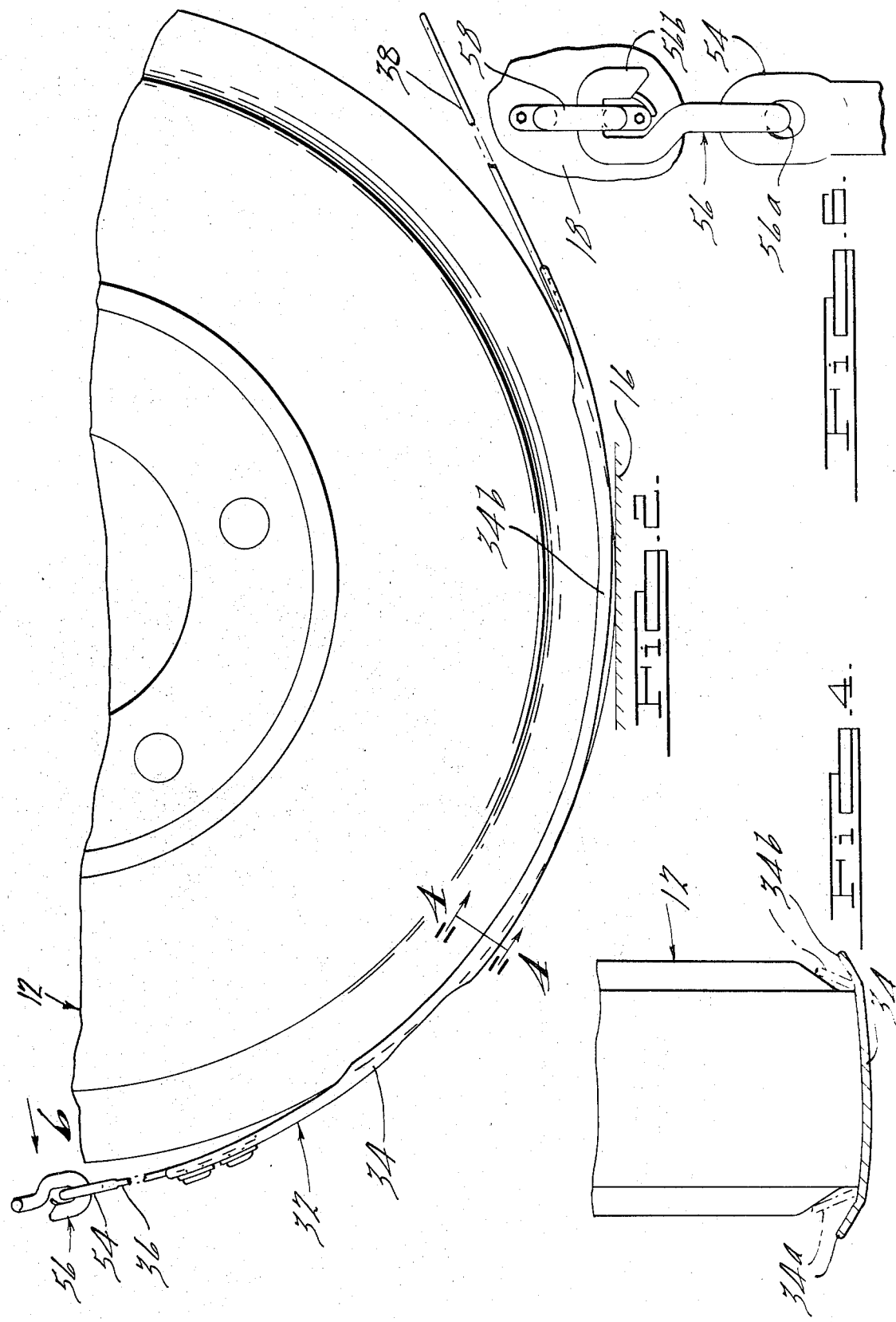

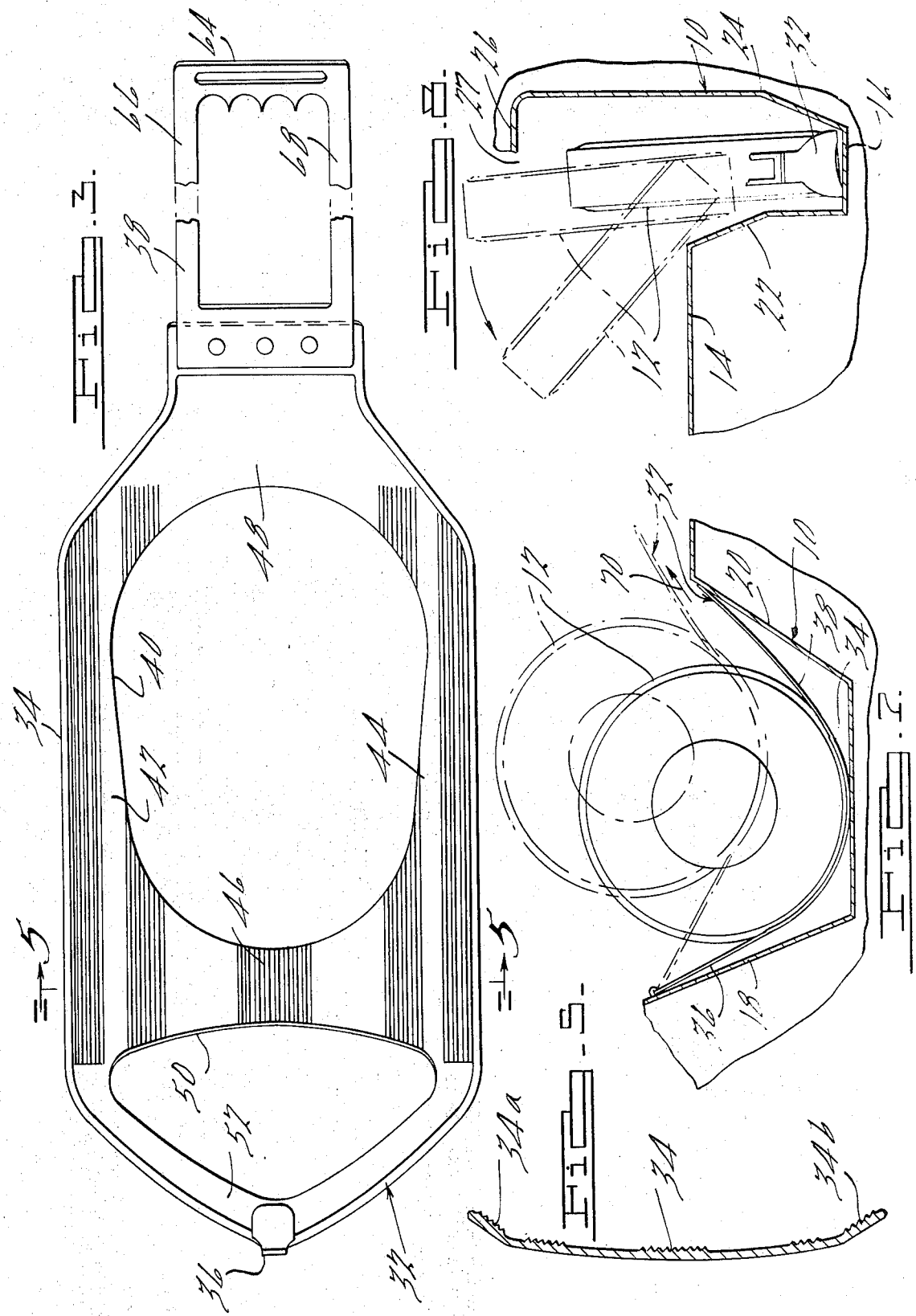

SPARE TIRE HOIST

BACKGROUND OF THE INVENTION

This invention relates to a spare tire hoist for removing a spare tire from a stowage well and more particularly to a sling-type hoist.

The desire on the part of automobile manufacturers to maximize the useful interior space of their vehicles has resulted in the spare tire stowage becoming less accessible in certain vehicle models. This is particularly true in the case of station wagons where the spare tire is often stowed in a covered stowage well located at one side of the rear floor of the vehicle. The spare tire lies in a generally upright position in the well and against the side panel of the vehicle to enable the width of the rear vehicle floor to a maximum. Moreover, the well may be relatively deep so that the spare tire protrudes vertically into the interior of the vehicle as little as possible. Generally speaking, this type of stowage substantially impairs the facility with which the spare tire can be moved to and from its stowed position. The vehicle structure in the vicinity of the stowage well may present a further encumbrance preventing the tire from being readily removed from the well. In all likelihood, the tire will have to be jockeyed and maneuvered out of the well, frequently with an excessive expenditure of energy by the person removing the tire. Needless to say, this procedure can be cumbersome, awkward, and frustrating, especially when the need to remove the spare tire is occasioned by a flat or a blowout.

SUMMARY OF THE INVENTION

Accordingly, among the objects of the present invention is the provision of an improved spare tire hoist which is entirely self-supporting; which supports the spare tire in a manner which prevents the hoist from slipping out of supporting engagement with the tire during hoisting; which is of a generally self-supporting shape and so contoured that when the hoist is returned to the well, the operating handle is always positioned to be conveniently grasped by the operator; which may be used to assist with stowage of a tire in the well; with which the spare tire can be quickly removed from the stowage well with normally only one hand; which requires relatively few parts and is of economical construction; and which reduces or eliminates the likelihood of contributing to the frustration of the user.

The foregoing as well as additional objects and advantages of the invention are achieved by providing a self-supporting spare tire hoist wherein a self-supporting tire support member is curved along at least a portion of its length, one end of the tire support member being connected to the vehicle body and the other end having a handle which by virtue of the self-supporting structure of the hoist is disposed in a position where it can always be readily grasped by the hoist operator so that when the hoist is actuated by pulling the handle, the support member engages and securely supports the weight of the tire as the tire is slung out of the well.

BRIEF DESCRIPTION OF THE DRAWINGS

The accompanying drawings illustrate a preferred embodiment of the invention constructed in accordance with the best mode presently contemplated for carrying out the invention.

FIG. 1 is a vertical sectional view, having a portion broken away, through a vehicle spare tire stowage well which includes the spare tire hoist of the present invention.

FIG. 2 is a view taken along line 2—2 in FIG. 1.

FIG. 3 is a top plan view of the spare tire hoist of the present invention and having portions broken away.

FIG. 4 is a reduced cross-sectional view taken along line 4—4 in FIG. 2.

FIG. 5 is a cross-sectional view taken along line 5—5 in FIG. 3.

FIG. 6 is a view taken in the direction of arrow 6 in FIG. 2.

FIG. 7 is a reduced left side view of FIG. 1 having portions broken away and illustrating the operation of the hoist of the present invention.

FIG. 8 is a right side view of FIG. 7.

DESCRIPTION OF THE PREFERRED EMBODIMENT

FIGS. 1, 7 and 8 illustrate a spare tire stowage well, or compartment, 10 in which a spare tire 12 is stowed in generally upright fashion. Stowage well 10 is situated at one side of a body floor panel 14. Well 10 comprises a bottom wall 16, end walls 18 and 20 (FIG. 7), and side walls 22 and 24 (FIG. 8). Side wall 22 extends from bottom wall 16 to floor 14 while side wall 24 extends from bottom wall 16 to a horizontal flange 26 which is turned inwardly over well 10. An opening 27 is thus provided between floor 16 and flange 26 through which tire 12 is insertable into and removable from stowage well 10. Tire 12 is secured within well 10 by a conventional hold down arrangement 28. Opening 27 is covered by removable cover 30.

The self-supporting hoist 32 of the present invention underlies tire 12 within well 10. Hoist 32 comprises a self-supporting tire support member 34, a connecting strap 36 at the forward end of support member 34 for connection to the vehicle and a self-supporting handle 38 at the rear end of support member 34 for grasping by the hoist operator. Support member 34 is contoured approximately to the curvature of the circumference of tire 12 and lies between the tire and bottom wall 16 of well 10. As best seen in FIG. 2, the preferred curvature of support member 34 is approximately 90° to provide suitable support for hoisting tire 12. Furthermore, when the tire and hoist are in the stowed position, support member 34 is preferably angularly offset approximately 25° in the clockwise direction as viewed in FIG. 2 (i.e. forwardly) from the vertical line passing through the axis of tire 12 and the point of contact of the tire with bottom wall 16. For a typical tire, the length of support member 34 as measured along its curvature is on the order of 20 inches. In the preferred construction, member 34 is injection-molded from a suitable plastic, for example polyethylene, to provide a low cost, reasonably sturdy, self-supporting piece, which nonetheless exhibits a certain flexibility which as will be seen is useful in cradling the tire.

As best shown in FIG. 3, support member 34 has a laterally centered opening 40 through a portion of which the thread of tire 12 protrudes when the hoist is operated to lift the tire out of the well. Accordingly, it will be appreciated that the width of support member 34 is greater than the width of the tread. Opening 40 is approximately oval and has its maximum width approximately where the tire tread contacts bottom wall 16. The width of opening 40 in this vicinity is greater than the width of the tire tread so as to permit the bottom of the tire to seat in the opening but the width of the opening decreases toward the forward end of the hoist. The circumferential extent of opening 40 about the axis of tire 12 is approximately 50° and opening 40 is slightly offset toward the rear of support member 34. From consideration of FIG. 3, it will be apparent that opening 40 is defined by a pair of laterally spaced side support straps 42 and 44 which extend lengthwise of member 34 and by a pair of laterally extending cross-straps 46 and 48 which bridge the forward and rear ends of side straps 42 and 44. Cross-strap 48 forms a yoke-like piece between the rear ends of straps 42 and 44 and allows handle 38 to be attached to support member 34 midway between side straps 42 and 44. Another yoke-like piece 52 bridges the forward ends of side straps 42 and 44 in parallel with and forwardly of cross strap 46 to define a triangularly shaped opening 50 in support member 34 forward of opening 40. Connecting strap 36 is connected to yoke 52 midway between side straps 42 and 44. The preferred embodiment thus accommodates the length and width requirements of support member 34 with a minimum of material. A transverse cross-section of support member 34 is shown in FIG. 5. The thickness of support member 34 is generally uniform and sufficient to carry the weight of the tire during hoisting. The lengthwise side margins 34a, 34b, of member 34, (FIG. 5) which are generally co-extensive with side straps 42 and 44, are turned upwardly from the slightly concave contour of the laterally central portion of member 34 to enhance the supporting engagement of support member 34 with tire 12 during hoisting, as will hereinafter be explained.

Connecting strap 36, which is also preferably made of polyethylene, connects the front end of support member 34 to wall 18 of well 10. The connection may be made as shown by providing integral rivets on the flattened end of the strap which are inserted into corresponding holes in support member 36 and then spun over metal washers to secure the attachment. The preferred attachment of strap 36 to well 10 permits strap 36, and hence hoist 32, to pivot freely. One way of accomplishing this is by terminating strap 36 in an eyelet 54. A connecting hook 56 connects eyelet 34 to a staple 58 on wall 18. One hooked end 56a of hook 56 passes through eyelet 54 and the other hooked end 56b of hook 56 passes through staple 58. The length of strap 36 is variable depending upon the particular location of staple 58 and may be typically approximately 15 inches in length for the staple location shown in the drawings.

Handle 38 is constructed to be a self-supporting piece, preferably also from polyethylene. Handle 38 comprises a flat attaching web 62 for attachment to support member 34, a hand grip 64 and a pair of side straps 66 and 68 which extend from web 62 to support hand grip 64 in a position where it may be readily grasped by the hoist operator. The attachment of handle 38 to support member 34 may be like that used for attaching strap 36. The length of handle 38 is variable depending upon the depth of stowage well 10. Preferably its length is such that hand grip 68 is positioned for convenient grasping by the hoist operator at a location near the level of floor 16. The length is approximately 15 inches in the illustrated arrangement.

In order to describe the operation of hoist 32, let it be assumed that cover 30 is removed and that tire 12 is in the position shown in FIGS. 1 and 2, which is the same position shown in solid lines in FIGS. 7 and 8. In this position, the tire tread is centered laterally with respect to support member 34. Now as the operator grasps hand grip 68 and begins to move the handle in the direction of arrow 70 in FIG. 7, the side margins 34a, 34b of support member 34 flex upwardly and inwardly against the sides of tire 12 (as shown in broken lines in FIGS. 1 and 4) so that the tire tread protrudes through the widest portion of opening 40. As hoist 32 begins to bear the full weight of tire 12, the tire is thus cradled in the hoist with side margins 34a, 34b providing lateral support to the tire. It will be observed that the preferred polyethylene construction of support member 34 contributes to the flexing characteristics of the support member as it takes the weight of the tire. With such lateral support and with the tire tread protruding through a portion of opening 40, it therefore becomes essentially impossible for hoist 32 to slip out of supporting engagement with tire 12. Continued upward movement of the hoist causes the tire to be slung out of well 10 in accordance with the sequence illustrated by the broken lines in FIGS. 7 and 8 so that the tire ultimately comes to rest flat on floor 16. It has been found that the hoist can be conveniently operated with one hand to remove the tire in accordance with the illustrated sequence. Aside from the mechanical advantage inherent in this sling type hoist, the support afforded by support member 34 and the mounting arrangement of the hoist contribute to the facility with which the tire may be removed from stowage.

After the tire has been removed from well 10, hoist 32 may be dropped back into the well. Provided that the width of bottom wall 16 is not substantially greater than the width of support member 34, and that the well is suitably constructed, support member 34 will drop into a position suitable for hoisting the tire out of the well after the tire has again been stowed. However, it is preferable to utilize the hoist to assist in stowing the tire back within the well to ensure the preferred lateral alignment of tire 12 on support member 34. Accordingly, with tire 12 lying flat on floor 16 at the side of well 10, the hoist may be oriented to receive the portion of the tire tread nearest the well. While hand grip 68 is held in one hand, tire 12 may be pushed with the other hand toward the well. As the tire begins to enter the well, the hoist and the tire may be manipulated so that the weight of the tire is increasingly borne by the hoist as the hoist and the tire are swung and lowered together into the well. When the tire and hoist are fully stowed, the bottom of the tire is retained within opening 40 so that upon subsequent operation of the hoist to remove the tire, the hoist will engage and support the tire in the fashion described above. A further advantage of the flexible polyethylene construction of support member 34 becomes apparent when the hoist is positioned at the bottom of the well before the tire is stowed. Should the tire be laterally misaligned with support member 34, the tire can press the support member reasonably flat against bottom panel 18. Thus, the upturned side margins 34a, 34 b of the support member 34 do not prevent the tire from assuming a minimum vertical position within the well.

Although the foregoing description describes the preferred operation of hoist 32, it will be appreciated that some lateral misalignment can be tolerated between tire 12 and support member 34. Thus, even when the tire tread does not completely sit within opening 40, at least a corner of the tread will protrude through the opening and it is still possible to hoist the tire out of the well. Alternatively, it would be possible to omit opening 40 in a self-supporting member 34 provided that the width was sufficiently great to provide adequate lateral support to the tire. However, this type of construction is not preferred because of the excessive amount of material utilized.

It will be appreciated that further modifications to the preferred embodiment will suggest themselves in view of the present disclosure and accordingly are included within the scope of the invention. For example, the invention contemplates a one piece hoist wherein support member 34, strap 36, and handle 38 are formed as a single piece. However, the three piece construction is preferred so that only the lengths of strap 36 and handle 38 need be changed to accommodate different stowage well dimensions.

I claim:

1. In a vehicle having a spare tire stowage well in which a spare tire is stowed in generally an upright position, a sling-type spare tire hoist for removing the spare tire from the well comprising a tire engaging portion underlying the tire and shaped to conform to the curvature of the tire, support means on one end of said tire engaging portion adapted to support said tire engaging portion on a wall of the stowage well and handle means on the other end of said tire engaging portion, said handle mans including a hand grip portion and an upwardly extending self-supporting strap portion confined between the spare tire and a wall of the well, said strap portion possessing sufficient vertical rigidity to hold said hand grip portion at an elevated position in said well where it may be conveniently grasped for removal of the spare tire.

2. A spare tire hoist as defined in claim 1 in which said tire engaging portion is made of molded resinous plastic materal having a curvature approximating the curvature of the tire periphery.

3. A spare tire hoist as defined in claim 1 in which said tire engaging portion possesses a curved self-supporting shape.

4. A spare tire hoist as defined in claim 1 in which said tire engaging portion possesses a large opening through which a peripheral portion of the tire projects.

5. A spare tire hoist as defined in claim 1 in which said tire engaging portion possesses a pair of upturned side margins which are drawn toward one another into gripping engagement with opposite side portions of the tire upon the tensioning of the hoist.

6. A spare tire hoist as defined in claim 1 in which said handle means comprises a unitary resinous plastic molding.

7. A spare tire hoist as defined in claim 1 in which said strap portion includes a pair of transversely spaced parallel straps connected to the opposite ends of said hand grip portion.

8. A spare tire hoist as defined in claim 1 in which said handle means comprises a unitary resinous plastic molding and in which said strap portion comprises a pair of laterally spaced parallel straps projecting from the opposite ends of said hand grip portion.

* * * * *